(12) United States Patent  
Schroeder et al.

(10) Patent No.: US 7,011,326 B1
(45) Date of Patent: Mar. 14, 2006

(54) PIEZORESISTIVE TORQUE SENSOR

(75) Inventors: Thaddeus Schroeder, Rochester Hills, MI (US); Michel Farid Sultan, Troy, MI (US); Andrzej Marian Pawlak, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 1550 days.

(21) Appl. No.: 09/663,030

(22) Filed: Sep. 15, 2000

Related U.S. Application Data (60) Provisional application No. 60/154,053, filed on Sep. 16, 1999.

(51) Int. Cl.
*B62D 13/00* (2006.01)
(52) U.S. Cl. .................................... 280/444; 280/446
(58) Field of Classification Search .............. 180/443, 180/444, 446
See application file for complete search history.

(56) References Cited

U.S. PATENT DOCUMENTS

| | | | | |
|---|---|---|---|---|
| 2,754,465 A | * | 7/1956 | Brier | 180/443 |
| 4,205,556 A | * | 6/1980 | Runyan | 73/727 |
| 4,629,024 A | * | 12/1986 | Buike et al. | 180/444 |
| 4,655,092 A | * | 4/1987 | Taig | 73/862.35 |
| 4,753,310 A | * | 6/1988 | Hashimoto | 180/446 |
| 4,945,298 A | * | 7/1990 | Nakashima | 318/635 |
| 4,972,133 A | * | 11/1990 | Hirota et al. | 108/446 |
| 5,010,970 A | | 4/1991 | Yamamoto | |
| 5,398,194 A | | 3/1995 | Brosh et al. | |
| 5,641,916 A | * | 6/1997 | Satoh et al. | 73/862.331 |
| 5,705,757 A | | 1/1998 | Wozniak | |
| 5,753,828 A | * | 5/1998 | Madni et al. | 73/862.338 |
| 5,798,641 A | | 8/1998 | Spagna et al. | |
| 5,831,180 A | * | 11/1998 | Tanaka et al. | 73/862.333 |
| 5,861,558 A | * | 1/1999 | Buhl et al. | 73/777 |
| 6,131,466 A | | 10/2000 | Vigna et al. | |

OTHER PUBLICATIONS

The Measurement, Istrumentation and Sensors Handbook; CRC/IEEE Press, J.G. Webster Ed. Page 23-6, 1999.

* cited by examiner

*Primary Examiner*—Lesley D. Morris
(74) *Attorney, Agent, or Firm*—Michael D. Smith (57) ABSTRACT

An automotive steering system with a torque sensor is disclosed. The steering system comprises a shaft linked to a set of road wheels; a sensor connected to the shaft for sensing torque applied to the shaft and operative to provide as output a signal indicative of said torque; a controller in signal communication with the sensor and operative thereby to accept as input from the sensor the signal indicative of the torque applied to the shaft; and a motor coupled to the shaft and in signal communication with the controller and operative thereby to accept as input from the controller a command to apply torque to the shaft.

25 Claims, 14 Drawing Sheets

PIEZORESISTIVE TORQUE SENSOR

CROSS REFERENCE TO RELATED APPLICATIONS

This application claims benefit to U.S. Provisional Application No. 60/154,053, filed on Sep. 16, 1999 and incorporated herein by reference.

TECHNICAL FIELD

This invention relates to an automotive steering system with a torque sensor.

BACKGROUND OF THE INVENTION

Current methods of measuring the torque applied to an automotive steering shaft are of the compliant kind and are typically accomplished by use of a torsion bar as part of the shaft, joining an upper and lower section thereof. The torsion bar is made of material with known mechanical properties and hence has known compliance. Thus, the applied torque can be calculated from a measured angular displacement, $\Delta\theta$, of the torsion bar (usually in the range of plus or minus a few degrees). The calculated torque is applied to a controller which then directs an electric steering torque assist motor to provide assist torque to the steering shaft.

However, this method introduces additional compliance into the control system—an undesirable parameter affecting the speed of response and the feel of the steering action. This method also suffers from the added expense of additional parts and the fabrication thereof. It is advantageous to provide a simplified torque sensor for direct sensing of the torque applied to a shaft to which the sensor is connected. In particular it is desirable to provide a faster and more accurate non-compliant measure of the torque applied to the shaft by the driver.

SUMMARY OF THE INVENTION

An automotive steering system with a torque sensor is disclosed. The steering system comprises a shaft linked to a set of road wheels; a sensor connected to the shaft for sensing torque applied to the shaft and operative to provide as output a signal indicative of said torque; a controller in signal communication with the sensor and operative thereby to accept as input from the sensor the signal indicative of the torque applied to the shaft; and a motor coupled to the shaft and in signal communication with the controller and operative thereby to accept as input from the controller a command to apply torque to the shaft.

DESCRIPTION OF THE DRAWINGS

Reference is made to the drawings wherein like elements and features are numbered alike and wherein.

DESCRIPTION OF THE PREFERRED EMBODIMENTS

This invention discloses a general type of torque sensor. The sensor is based on piezoresitive measurements. In particular, the sensor may be useful to measure torque for electric power steering and/or steer-by-wire applications. The sensor is inserted in a rotating shaft to which torque is applied. The application of torque generates strains that are transmitted from the shaft to the sensing device. Piezoresistors in the sensing device respond to strain in the form of a measurable change in resistance. An electronic circuit converts the change in resistance into a voltage output signal that is linearly related to torque.

The invention features easy manufacturability and low cost. In addition, is suitable to fit different applications; namely the sensor can operate with steering systems that are non-compliant, highly compliant, or that may possess a compliance therebetween, depending on the requirements of the application.

Figure 11:
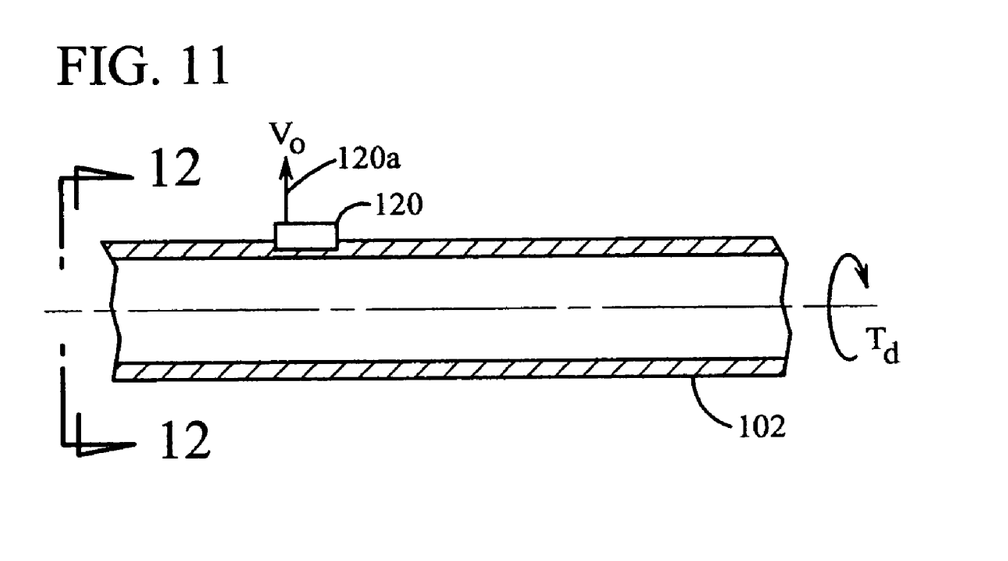
FIG. 11 is a cross sectional view of a shaft subject to torque.

The basic concept of the torque sensor is presented in FIG. 11. A shaft 102, for example a cylindrical hollow shaft, twists as it is subjected to torque, $T_d$. A ceramic based sensing device in the nature of a cantilever beam is imbedded in the shaft 102. As the shaft 102 twists, one end of the cantilever beam of the sensor 120 moves with respect to the other end of the cantilever beam, thereby generating strains that are highest very close to the fulcrum of the cantilever beam. Piezoresistors printed at the fulcrum of the cantilever beam therefore change in resistance in proportion to the strain level which in turn is proportional to twist angle, $\theta$, and the applied torque $T_d$. The compliance of the whole system can be manipulated by adjusting the inner and outer radii of the shaft. For stiffer, less compliant configurations, the sensitivity of the device can be increased by properly adjusting the length of the cantilever beam.

Figure 4:
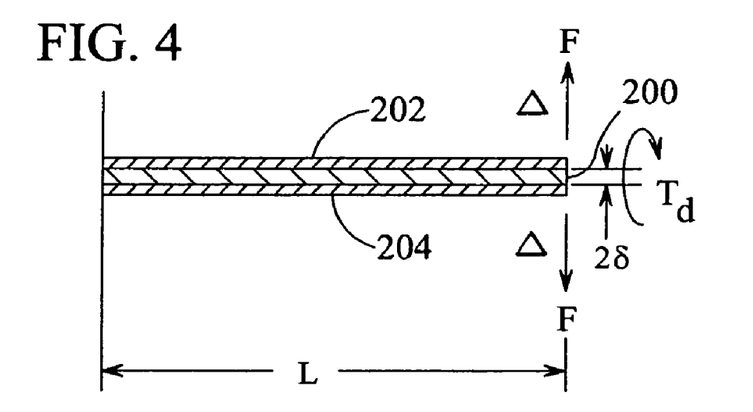
FIG. 4 is a diagrammatic representation of a piezosensitive element coupled to a deformable element.
Figure 12:
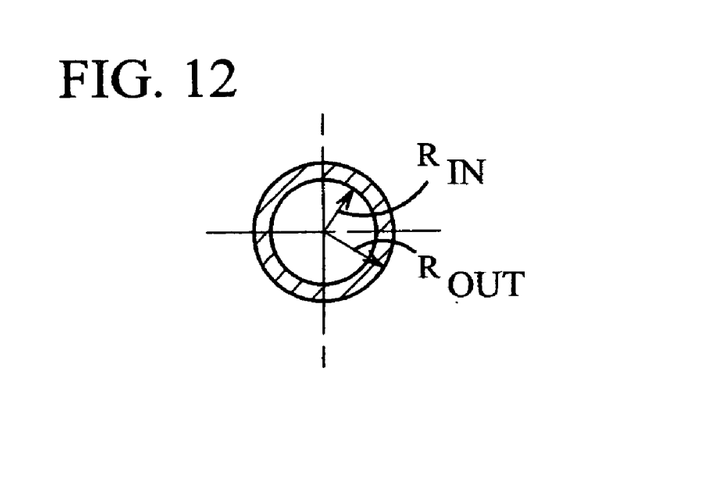
FIG. 12 is an end view of the shaft of FIG. 11.

FIGS. 4, 11 and 12 provide a more complete analysis of the torque sensor. Torque, $T_d$, that is applied to the shaft generates a twist angle, $\theta$, given by:

$$\theta = 2\, T_d L / \pi (R_{out}^4 - R_{in}^4) G \qquad (1)$$

where $T_d$ (in-lb) is the applied torque, L (in) is the length of the shaft portion where the sensing device is inserted, G is the modulus of rigidity of the material (lb/in$^2$), and $R_{in}$ and $R_{out}$ (in) are the inner and outer radii of the shaft 102, respectively. The resulting displacement, $\Delta$, at the free end of the cantilever beam ($R_{out}$) is given by:

$$\Delta = R_{out}\, \theta \qquad (2)$$

The relative displacement between the free and the fixed ends of the cantilever beam generates a deflection profile, y(x), that is well characterized. For a beam of length L, thickness 2$\delta$, and displacement $\Delta$ at the tip of the cantilever beam, the deflection profile, y(x), at any location x along the beam is given by:

$$y(x) = \Delta(3\, L\, x^2 - x^3)/2\, L^3 \qquad (3)$$

The surface strain at the top and lower surfaces of the beam is obtained at any location along the beam according to the following formula:

$$\epsilon(x) = \pm \delta/2\; d^2 y/dx^2 = \pm 3\, \delta(L-x)\Delta/2\, L^3 \qquad (4)$$

The strain level is highest at the location of the piezoresistors (x=0):

$$\epsilon(x=0) = \pm 3\, \delta \Delta / 2\, L^2 \qquad (5)$$

Figure 5:
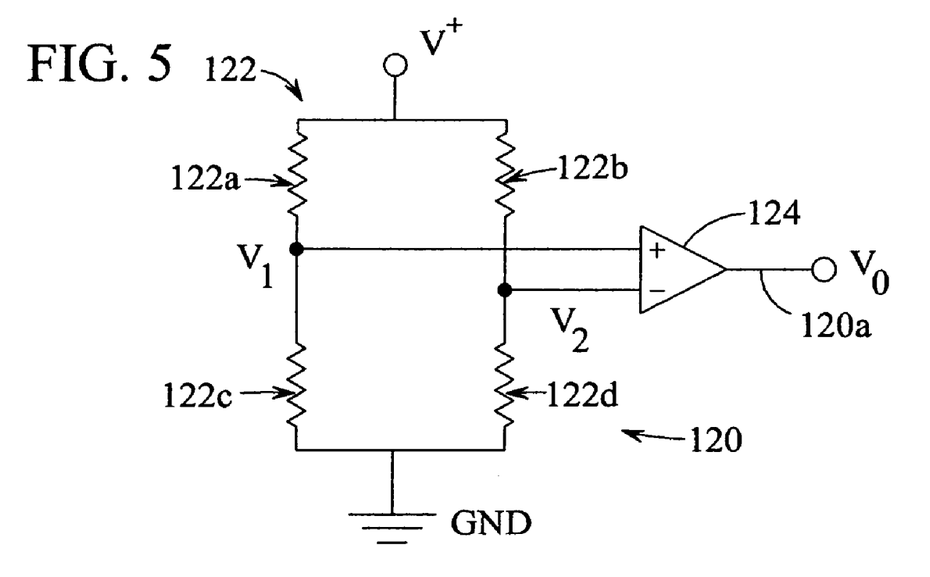
FIG. 5 is a schematic diagram of a piezosensitive electric circuit.

As illustrated in FIG. 5, there are four piezoresistors 122a, 122b, 122c, 122d that are printed on a ceramic substrate, two on the top side, and two on the lower side. The top piezoresistors are subjected to tensile stress and, accordingly, increase in resistance, while the bottom piezoresistors experience compressive stress together with a decrease in resistance or vice versa. The four piezoresistors 122a, 122b, 122c, 122d are connected in a Wheatstone bridge configuration 120 as illustrated in FIG. 5. The change in resistance of the piezoresistors 122a, 122b, 122c, 122d is given in terms of the strain level according to the following formula:

$$\Delta R/R = \gamma \epsilon(0) = \pm 3\, \gamma \delta \Delta / 2\, (L_R)^2 \qquad (6)$$

where $L_R$ is the actual length of the piezoresisror and $\gamma$ is the Gauge Factor of the piezoresistive material (~13 for a typical material). The voltage change across the bridge is then:

$$\Delta V = (\Delta R/R) \times V^+ \qquad (7)$$

where $V^+$ is typically 5V. Finally, the sensor output which is the applied torque, $T_d$, is given by the product of amplifier gain, k, times the voltage change across the bridge, $\Delta V$.

Figure 1:
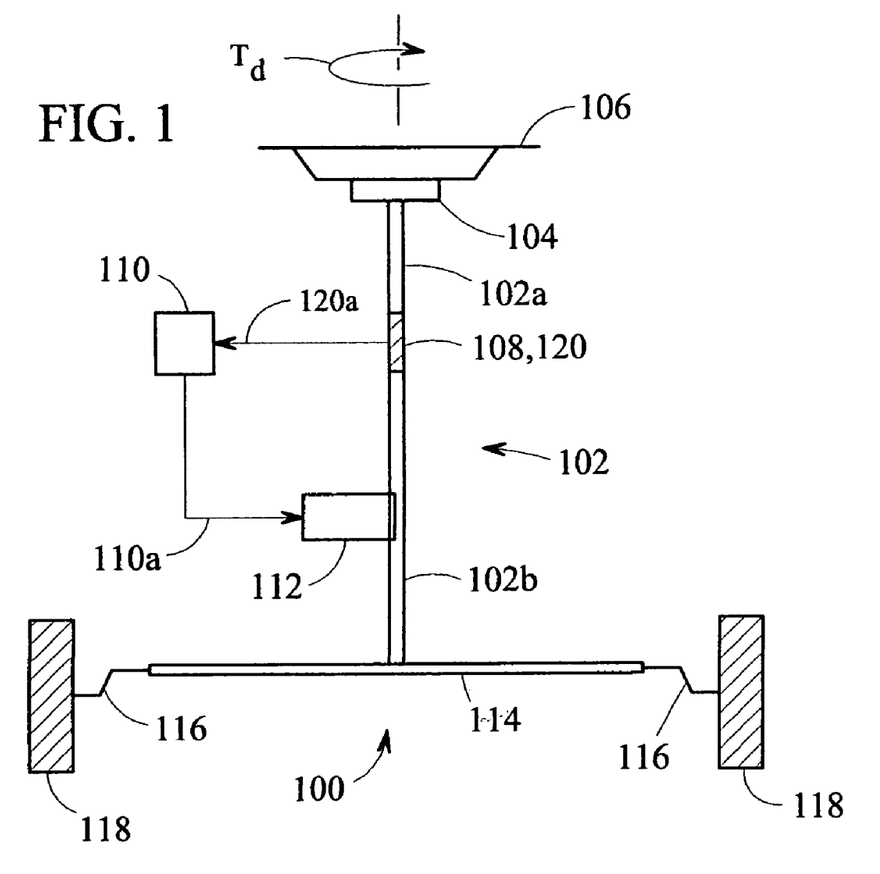
FIG. 1 is a generalized schematic representation of a compliant automotive steering system incorporating a torsion bar for measuring torque.
Figure 13:
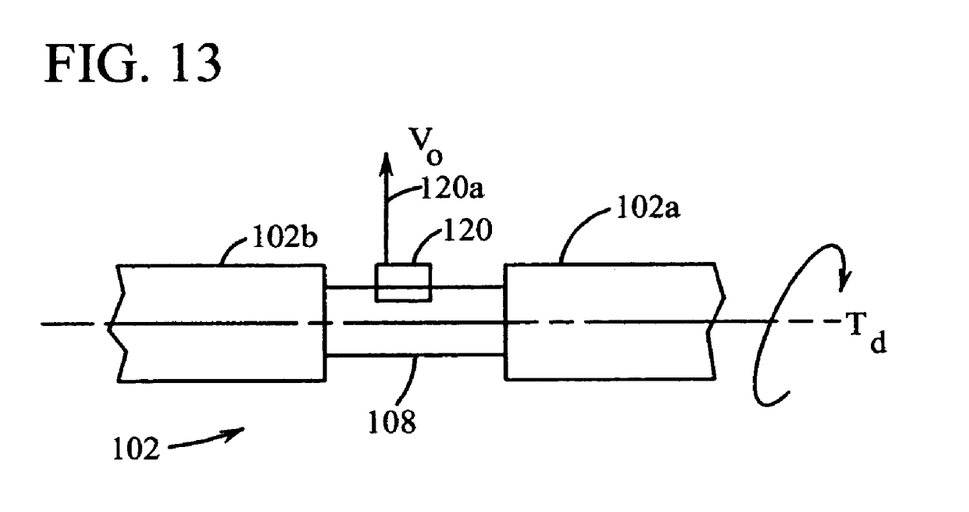
FIG. 13 is a view of the sensor of the present invention imbedded in a torsion bar of a shaft subject to torque.

Referring to FIG. 1, therein depicted is a generalized schematic representation of an automotive steering system 100 incorporating a torsion bar 108 and a sensor 120 for measuring torque. The automotive steering system 100 comprises a shaft 102 linked to a set of road wheels 118 through a rack 114 and a set of steering linkages 116. The shaft 102 includes an upper shaft 102a and a lower shaft 102b joined by a torsion bar 108 (FIG. 13). A steering wheel 106 is connected to a hub 104 which is in turn connected to the upper shaft 102a. A controller 110 is in signal communication with the torsion bar 108 and sensor 120, and accepts as input therefrom a signal 120a indicative of the torque applied to the shaft 102 by an operator through the steering wheel 106. The controller 110 then directs a command 110a to a motor 112 coupled to the lower shaft 102b to provide torque assist to the operator in the steering action.

Figure 2:
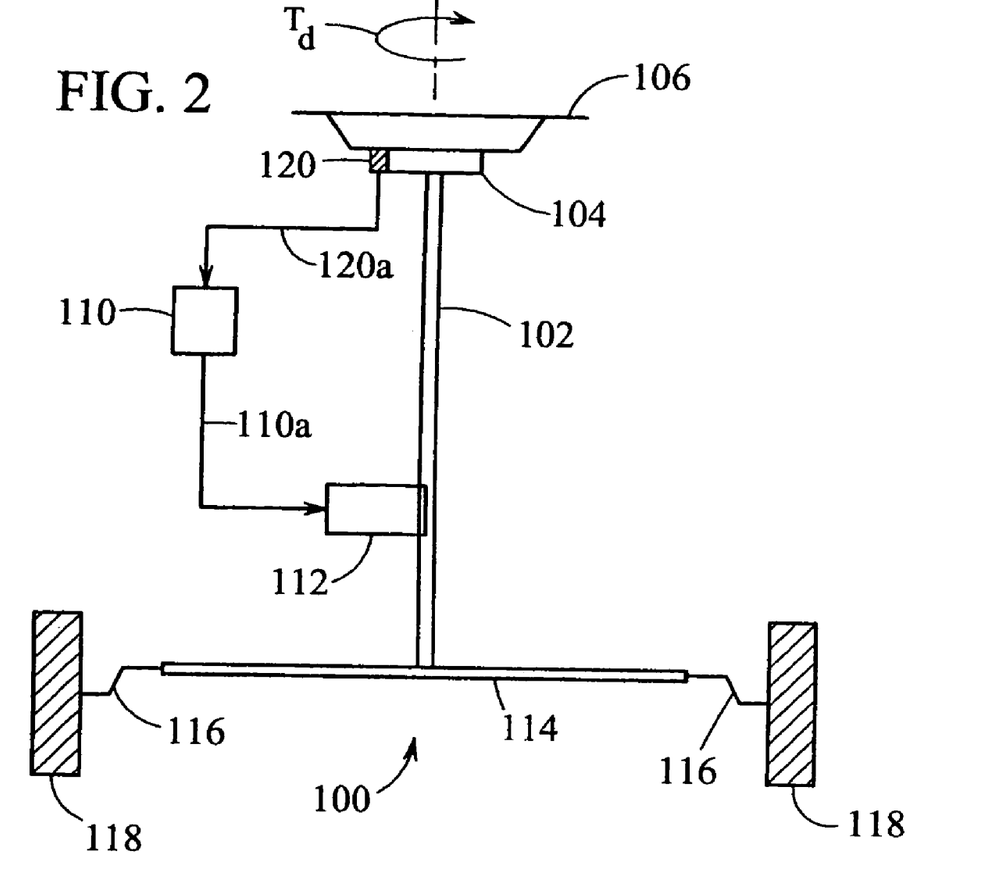
FIG. 2 is a generalized schematic representation of an automotive steering system incorporating a torque sensor for measuring torque.

Reference will now be had to FIG. 2. Therein depicted is a generalized schematic representation of an automotive steering system 100 incorporating a sensor 120 for measuring torque. The automotive steering system 100 includes a shaft 102 as a single unit connecting the hub 104 and steering wheel 106 directly to the rack 114 for steering the road wheels 118. The sensor 120 is mounted on the hub 104. The controller 110 is in signal communication with the sensor 120 and accepts as input therefrom a signal 120a indicative of the torque applied to the shaft 102 by an operator by way of the steering wheel 106 through the hub 104. The controller 110 then directs the command 110a to the motor 112 coupled to the shaft 102 to provide torque assist to the operator in the steering action.

Figure 3:
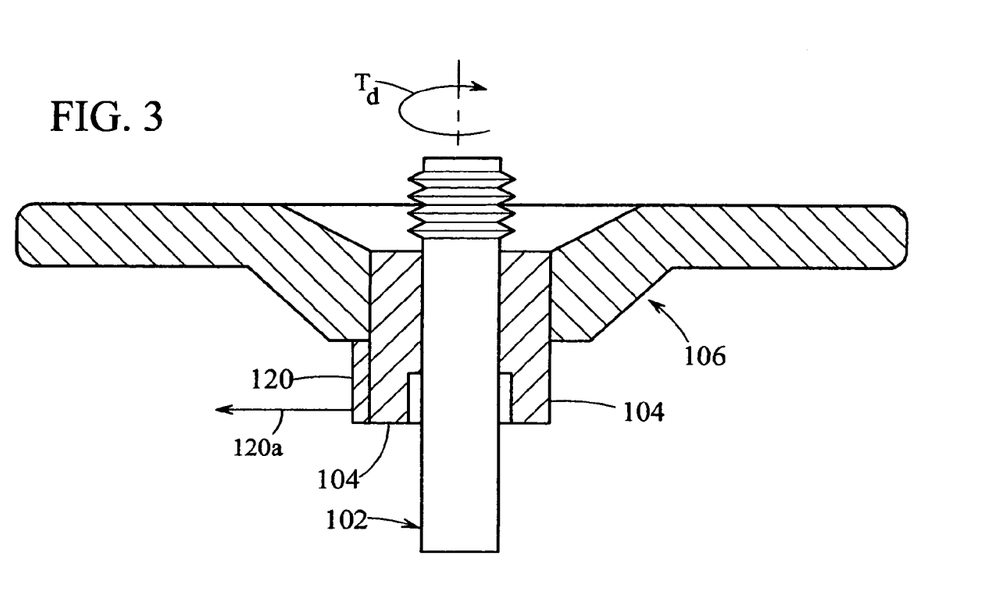
FIG. 3 is a generalized representation of a torque sensor coupled to a steering hub.

Reference will now be had to FIG. 3. Therein depicted is a generalized representation of a sensor 120 coupled to a hub 104. Torque is developed in the shaft 102 by way of a force applied to the steering wheel 106 by a driver. The applied torque, $T_d$, is transmitted to the shaft 102 through the hub 104 which is connected the shaft 102 and the steering wheel 106. The sensor 120 is in intimate contact with the hub 104 and thus suffers some deformation as a result of the deformation suffered by the hub 104 due to application of the applied torque, $T_d$. This deformation can be sensed by, for instance, a piezosensitive device, thus providing the ability to determine applied torque, $T_d$. The piezosensitive nature of the sensor 120 can be better understood with reference to FIG. 4. Therein depicted is a diagrammatic representation of a deformable element 200 in intimate contact with at least one piezosensitive element 202, 204. If the deformable element 200 is made to deform under the application of a force, F, or torque, $T_d$, the piezosensitive elements 202, 204 suffer either compression or tension, thereby generating an electric signal indicative of the force or torque acting upon the deformable element 200. It will be appreciated in FIG. 4 that the at least one piezosensitive element 202, 204 may be a single piezosensitive element 202 disposed on one surface of the deformable element 200.

Reference will now be had to FIG. 5. Therein depicted is a schematic diagram of a sensor 120 comprising a piezosensitive circuit 122 connected to an amplifier 124. The piezosensitive circuit 122 is a Wheatstone bridge circuit comprising a set of interconnected piezosensitive resistors 122a, 122b, 122c, 122d each in intimate contact with the hub 104(not shown) and subject thereby to deformation as a result of the deformation of the hub 104 suffered due to the application of torque thereto. It will be appreciated that the set of interconnected piezosensitive resistors 122a, 122b, 122c, 122d act in the same manner as described with respect to the piezosensitive elements of FIG. 4. A voltage, $V^+$, is applied to the Wheatstone bridge at one terminal thereof and a second terminal is connected to electrical ground. Due to the aforesaid deformation of the hub 104, a voltage difference $\Delta V = V_2 - V_1$, is developed within the piezosensitive circuit 122 such that the torque, $T_d$, applied to the sensor 120, is proportional to, $\Delta V$, i.e., $$T_d = k \times \Delta V, \qquad (8)$$

where k is an experimentally determined constant. The amplifier 124 is operative thereby to amplify the voltage difference, $\Delta V$, and provide as output therefrom, a signal, $V_o$, indicative of the torque, $T_d$, applied to the hub 104 and thus to the shaft 102.

Figure 6:
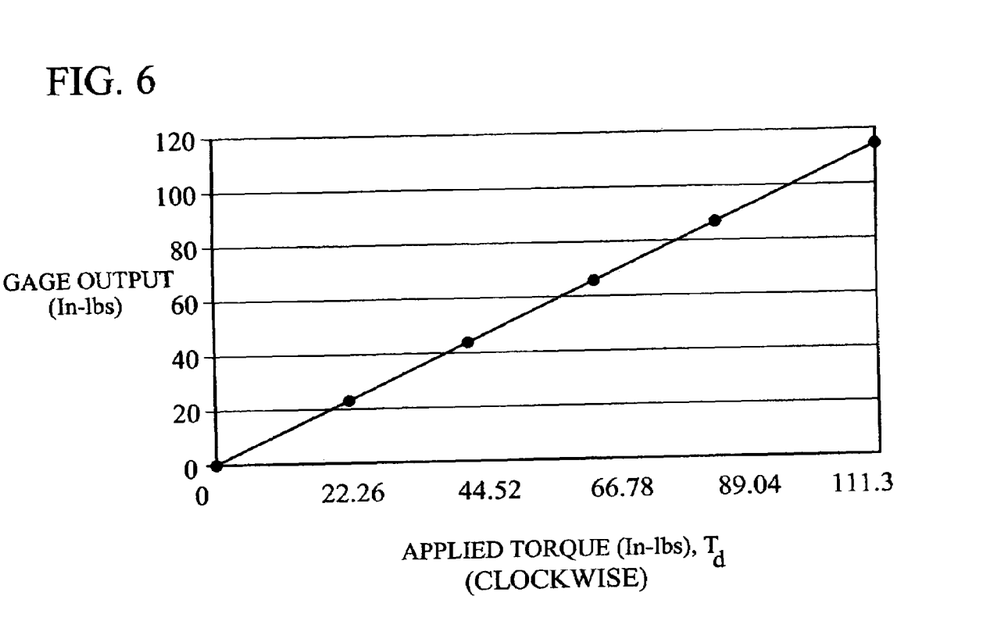
FIG. 6 is a graphical representation of sensor torque as a function of applied torque in the clockwise direction.
Figure 7:
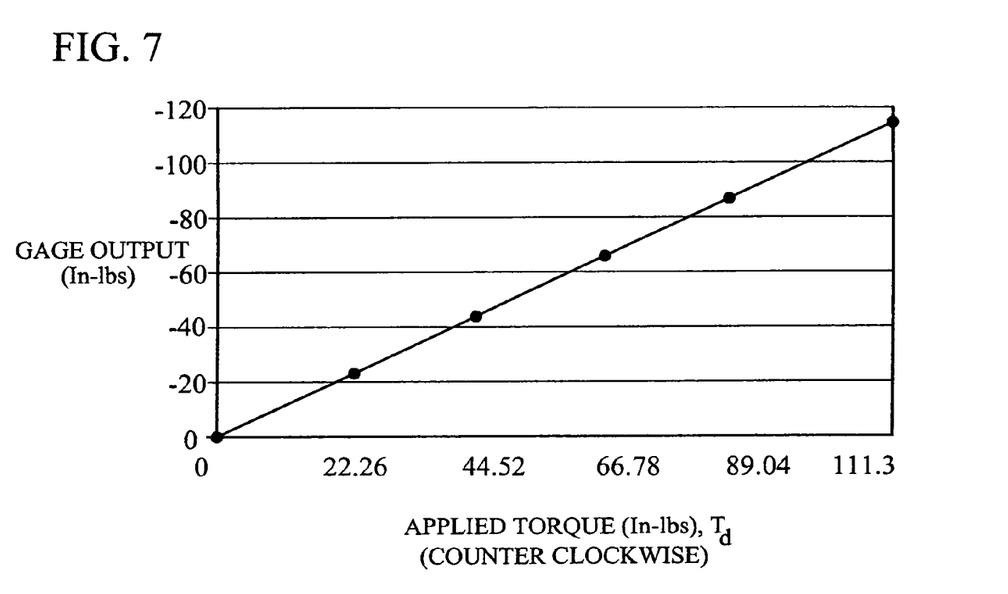
FIG. 7 is a graphical representation of sensor torque as a function of applied torque in the counter clockwise direction.
Figure 15:
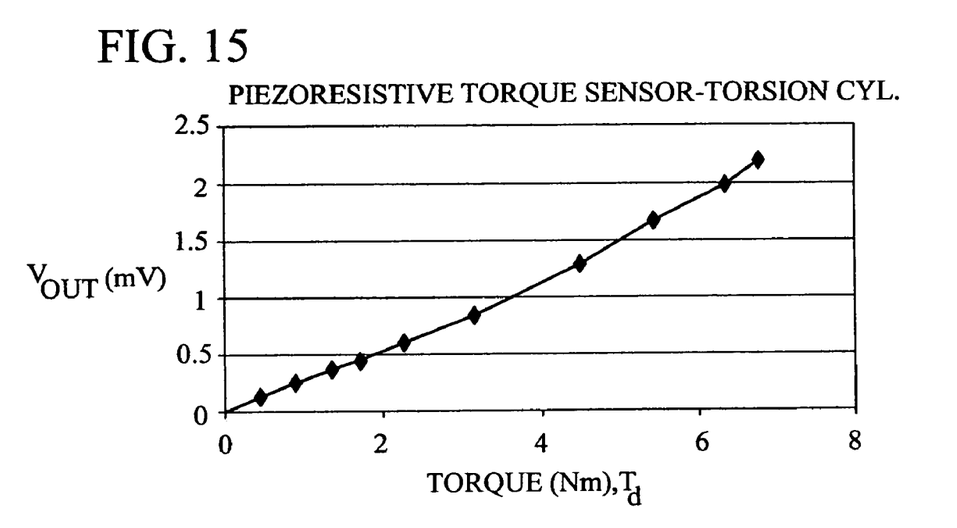
FIG. 15 is a graphical representation of sensor torque as a function of sensor output voltage.

The linearity of Eqn. 8 is best exemplified with reference to FIGS. 6, 7 and 15. FIGS. 6 and 7 depict sensor output, $V_o$, as a linear function of the torque, $T_d$, applied to the hub 104 in both a clockwise(FIG. 6) and counterclockwise(FIG. 7) direction. FIG. 15 is a graphical representation of sensor torque as a function of sensor output voltage showing a substantially linear relationship between the applied torque, $T_d$, and the output voltage, $V_o$.

Figure 14A:
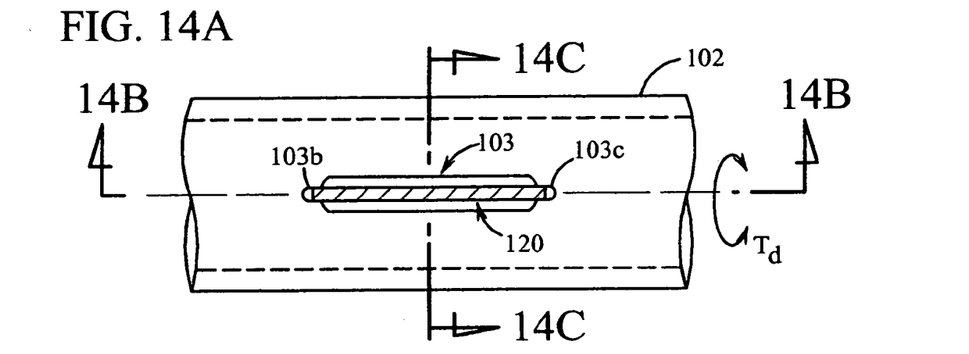
FIG. 14A is a top view of the sensor of the present invention imbedded in a shaft.
Figure 14B:
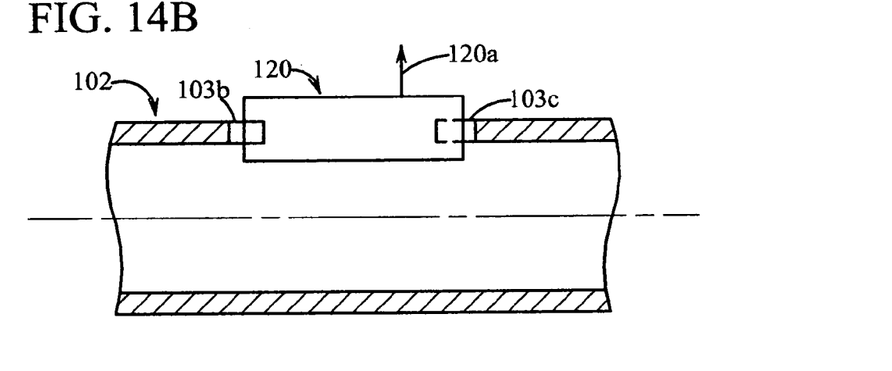
FIG. 14B is a cross sectional view of the sensor of FIG. 14A.
Figure 14C:
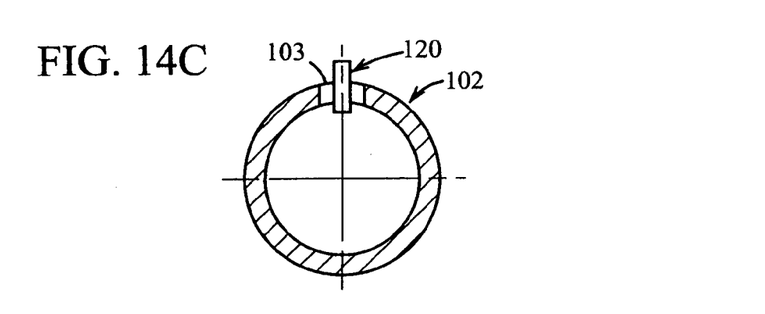
FIG. 14C is an end cross sectional view of the sensor of FIG. 14A.
Figure 14D:
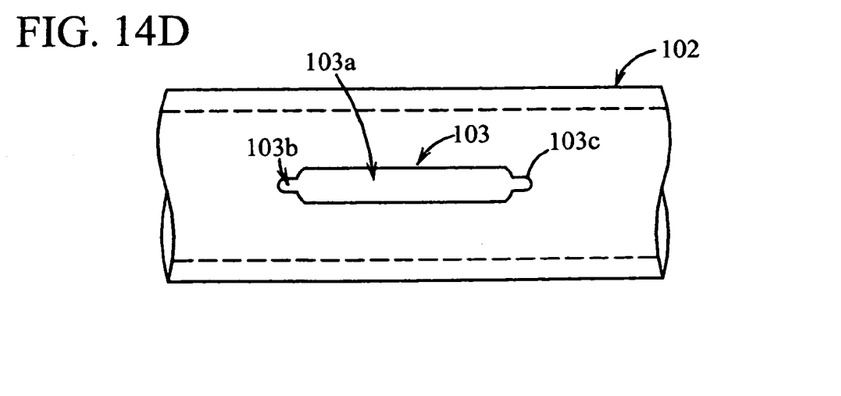
FIG. 14D is a view of the slot in the shaft of FIG. 14A for accepting the sensor of the present invention.

The sensor 120 of the present invention is depicted in FIGS. 14A–14D. In FIGS. 14A and 14B the sensor 120 is placed in a slot 103 in the wall of the tubular shaft 102. Narrow sections 103b, 103c of the slot 103 firmly grasp the ends of the sensor 120. A central section 103a of the slot 103 provides space for electronic circuitry mounted on a substrate of the sensor 120. As seen in FIGS. 14A, 14B and 14C, the sensor 120 is positioned in the slot 103 perpendicular to the wall of the shaft 102. Thus, upon the application of the torque, $T_d$, twisting of the shaft 102 causes a deflection, $\Delta$, in the sensor 120 in the manner shown in the cantilever beam of FIG. 4, contrary to the nature of a strain gage.

Figure 16:
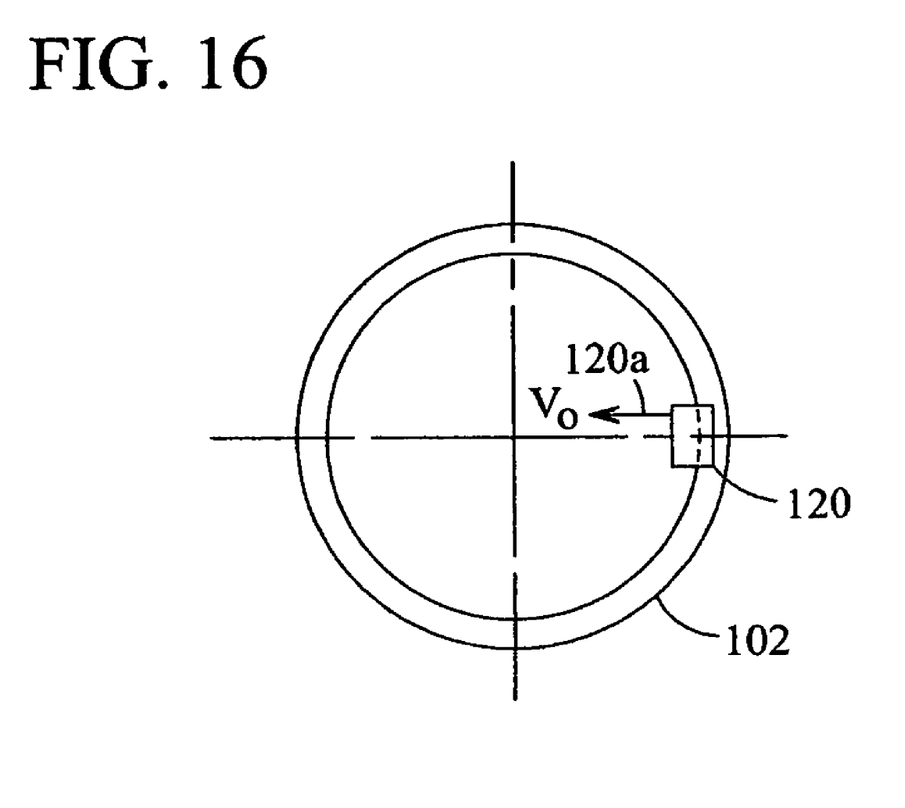
FIG. 16 shows the sensor of the present invention positioned in the interior surface of a shaft.

In FIG. 13 it is seen that the sensor 120 may be placed in the torsion bar 108 connecting the upper 102a and lower 102b sections of the steering shaft 102. In FIG. 16 it is seen that the sensor 120 may be placed in the interior surface of the steering shaft 102.

Figure 8:
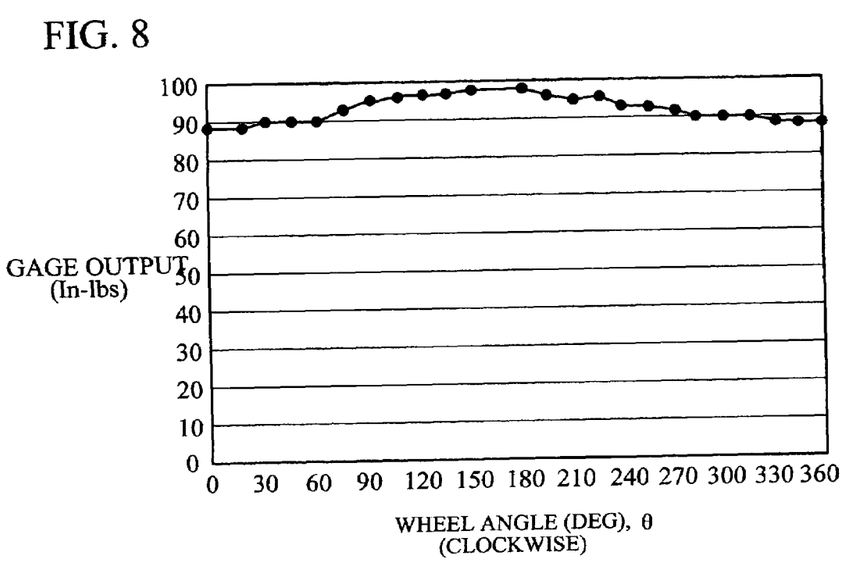
FIG. 8 is a graphical representation of sensor output as a function of steering wheel angle, $\theta$, in the clockwise direction for constant applied torque.
Figure 9:
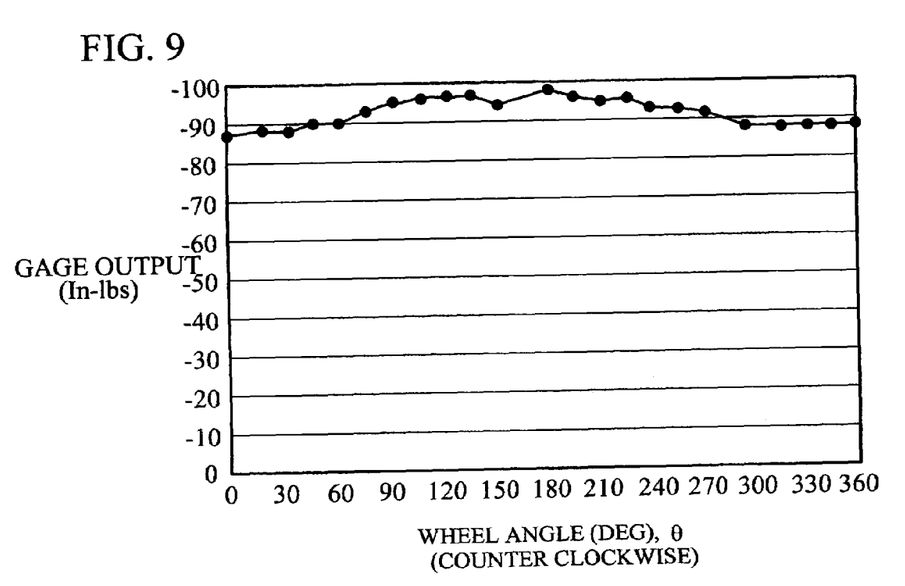
FIG. 9 is a graphical representation of sensor output as a function of steering wheel angle, $\theta$, in the counterclockwise direction for constant applied torque.
Figure 10:
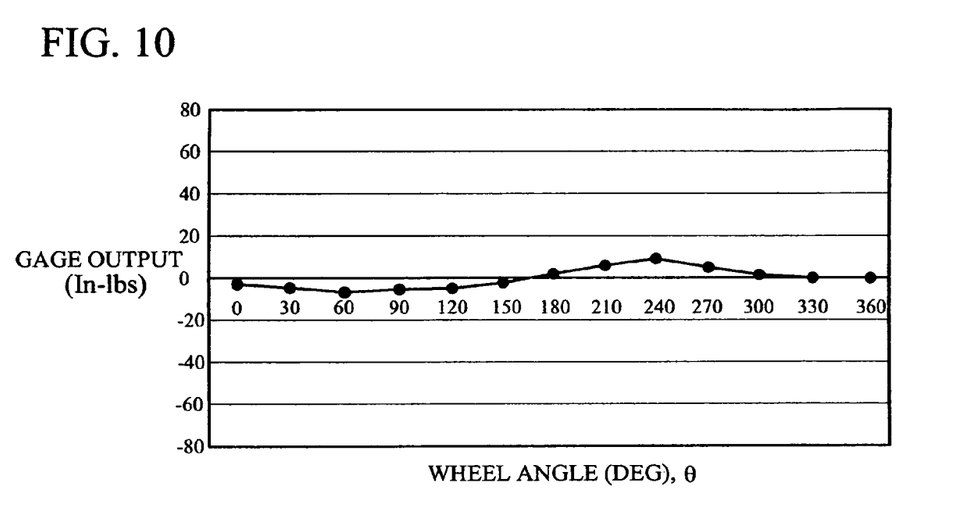
FIG. 10 is a graphical representation of sensor torque as a function of steering wheel angle, $\theta$, with constant axial force applied to the steering wheel for zero applied torque.

The practicality of the sensor 120 of the present invention is best exemplified with reference to FIG. 8, FIG. 9 and FIG. 10. FIGS. 8 and 9 depict sensor output, $V_o$, as a function of steering wheel angle, $\theta$ for a fixed applied torque, $T_d$, in the clockwise(FIG. 8) and counterclockwise(FIG. 9) direction. As best understood from FIGS. 8 and 9, $V_o$ is substantially constant through 360° of clockwise and counterclockwise rotation for fixed applied torque, $T_d$. FIG. 10 depicts sensor output, $V_o$, as a function of steering wheel angle, $\theta$, for a fixed axial load on the steering wheel 106. As best understood from FIG. 10, $V_o$ is substantially constant through 360° of rotation for a fixed axial load.

It is therefore be apparent from the foregoing description of the present invention that the advantage of this invention is that the sensing device is well adapted to large scale manufacturing, offers low cost, high durability, and high stability. In addition, the sensor may incorporate all of the necessary electronics, including a differential amplifier and trimmable resistors to balance the bridge circuit and adjust amplifier gain and offset. Since there are no leads or connections within the bridge circuit or between the bridge circuit and the amplifier, the effects of parasitic resistances are reduced or eliminated. There are two inputs to the sensor 120 (supply voltage, $V^+$, and electrical ground), and one output voltage, $V_o$, which is proportional to displacement, $\theta$, and torque $T_d$.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed are not to be construed as limiting to the claims.

What is claimed is:

1. An automotive steering system comprising:
   a shaft linked to a set of road wheels, the shaft including a slot parallel to the axis of the shaft and located at a single peripheral location about the surface of the shaft;
   a piezoresistive sensor positioned within and along the length of the slot and responsive as a cantilever beam to torque applied to the shaft and operative thereby to provide as output a signal indicative of the applied torque;
   a controller in signal communication with the sensor and operative thereby to accept as input from the sensor the signal indicative of the torque applied to the shaft; and
   a motor coupled to the shaft and in signal communication with the controller and operative thereby to accept as input from the controller a command to apply torque to the shaft.

2. The automotive steering system as set forth in claim 1 wherein the shaft includes
   a first section;
   a second section linked to the set of road wheels; and
   a third section joining the first and second sections.

3. The automotive steering system as set forth in claim 1 wherein the piezoresistive sensor comprises at least one piezosensitive element coupled to a ceramic substrate.

4. The automotive steering system as set forth in claim 3 wherein the at least one piezosensitive element is part of an electric circuit.

5. The automotive steering system as set forth in claim 3 wherein the at least one piezosensitive element is connected to an amplifier operative thereby to provide as output the signal indicative of the torque applied to the shaft.

6. The automotive steering system as set forth in claim 4 wherein the at least one piezosensitive element includes a piezoresistor.

7. The automotive steering system as set forth in claim 4 wherein the electric circuit comprises a bridge circuit.

8. The automotive steering system as set forth in claim 7 wherein the bridge circuit is a wheatstone bridge.

9. The automotive steering system as set forth in claim 1 wherein the shaft includes
   a hub connected to the shaft; and
   a steering wheel connected to the hub.

10. The automotive steering system as set forth in claim 9 wherein the sensor comprises at least one piezosensitive element coupled to the hub.

11. The automotive steering system as set forth in claim 10 wherein the at least one piezosensitive element is part of an electric circuit.

12. The automotive steering system as set forth in claim 10 wherein the at least one piezosensitive element is connected to an amplifier operative thereby to provide as output the signal indicative of the torque applied to the hub.

13. The automotive steering system as set forth in claim 11 wherein the at least one piezosensitive element includes a piezoresistor.

14. The automotive steering system as set forth in claim 11 wherein the electric circuit comprises a bridge circuit.

15. The automotive steering system as set forth in claim 14 wherein the bridge circuit is a wheatstone bridge.

16. An automotive torque sensor for sensing torque applied to a shaft, the sensor comprising:
   at least one piezosensitive element coupled to the shaft; and
   an amplifier in signal communication with the at least one piezosensitive element and operative thereby to provide as output a signal indicative of the applied torque applied to the shaft.

17. The automotive torque sensor as set forth in claim 16 wherein the at least one piezosensitive element comprises an electric bridge circuit.

18. The automotive steering system as set forth in claim 17 wherein the bridge circuit is a wheatstone bridge.

19. The automotive steering system as set forth in claim 1 wherein the shaft includes
an exterior surface;
an interior surface; and
wherein the sensor is positioned on the interior surface of the shaft.

20. The automotive steering system as set forth in claim 19 wherein the sensor comprises at least one piezosensitive element coupled to the shaft.

21. The automotive steering system as set forth in claim 20 wherein the at least one piezosensitive element is part of an electric circuit.

22. The automotive steering system as set forth in claim 20 wherein the at least one piezosensitive element is connected to an amplifier operative thereby to provide as output the signal indicative of the torque applied to the shaft.

23. The automotive steering system as set forth in claim 21 wherein the at least one piezosensitive element includes a piezoresistor.

24. The automotive steering system as set forth in claim 21 wherein the electric circuit comprises a bridge circuit.

25. The automotive steering system as set forth in claim 24 wherein the bridge circuit is a wheatstone bridge.

* * * * *